(12) United States Patent
Ohkouchi

(10) Patent No.: US 6,269,543 B1
(45) Date of Patent: Aug. 7, 2001

(54) PORTABLE SAWS HAVING CHIP SCATTERING PREVENTION DEVICES

(75) Inventor: Katumi Ohkouchi, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/358,935

(22) Filed: Jul. 23, 1999

(30) Foreign Application Priority Data

Jul. 24, 1998 (JP) .................................................. 10-209545

(51) Int. Cl.⁷ .................................................. B23D 45/16
(52) U.S. Cl. .................................................. 30/391; 30/390
(58) Field of Search .............................. 30/389–391, 377, 30/124

(56) References Cited

U.S. PATENT DOCUMENTS 4,856,394 * 8/1989 Clowers ............................... 30/377 X

FOREIGN PATENT DOCUMENTS 6-47683    2/1989   (JP) .

* cited by examiner

*Primary Examiner*—Douglas D. Watts
(74) *Attorney, Agent, or Firm*—Dennison, Scheiner, Schultz & Wakeman

(57) ABSTRACT

A portable saw includes a saw unit that has a motor and a saw blade. The motor rotatably drives the saw blade. A base is adapted to rest on a workpiece to be cut. The saw unit is vertically movable relative to the base to vary a cutting depth into the workpiece. A cover prevents cutting chips from scattering to the surrounding area and is pivotable about a pivotal axis that is the same as the rotational axis of the saw blade. A control device controls the pivotal position of the cover in response to the vertical position of the saw unit relative to the base.

18 Claims, 6 Drawing Sheets

PORTABLE SAWS HAVING CHIP SCATTERING PREVENTION DEVICES

BACKGROUND OF THE INVENTION

1. Field of the Invention

The present invention relates to portable saws having a device that prevent chips generated by a cutting operation from scattering to the surrounding area.

2. Description of the Related Art

A known portable saw having a device for preventing cutting chips from scattering is taught in Japanese Utility Model Publication No. 6-47683. For explanation purposes, FIG. 2 from this Japanese Utility Model Publication has been reproduced as FIG. 8 in this application. As shown in FIG. 8, the known portable saw consists of a bifurcated chip cover 52 that has a pair of lateral walls 52a and a front wall 52b so as to cover both lateral sides and the front side of a cutting chip exhaust area, which area is normally defined as a position adjacent to a base 53 on the front side (right side as viewed in FIG. 8) of a saw blade 51. The base 53 is adapted to be placed on a workpiece and the saw blade 51 can be moved to partly extend through the base 53 to cut the workpiece. The chip cover 52 may prevent the cutting chips of the workpiece from being exhausted either forwardly or laterally. Instead, the cutting chips are intended to be swept upwardly in the rotational direction of the saw blade 52 (as indicated by an arrow in FIG. 8) so as to be collected in a chip collector (not shown).

The chip cover 52 is mounted so as to pivot vertically on a bracket 53a by means of a pin 54. The bracket 53a is fixed to the upper surface of the base 53. A torsion spring 55 serves to normally bias the chip cover 52 to contact the upper surface of the base 53. The saw blade 51 is rotatably mounted on a saw unit 56 that also is mounted so as to vertically pivot around the bracket 53a by means of a pin 57. A motor (not shown) drives the saw blade 51.

As the saw unit 56 pivots upward relative to the base 53, the blade profile below is reduced, so that the cutting depth of the saw blade 51 into the workpiece is reduced. Because the chip cover 52 is biased by the torsion spring 55 to contact the base 53, both lateral sides of the cutting chip exhaust area are covered by the lateral walls 52a of the slide cover 52.

However, because the saw blade 51 separates from the front wall 52b of the chip cover 52 as the saw unit 56 pivots upward, the space between the saw blade 51 and the front wall 52b increases. In other words, the front wall 52b moves away from the cutting chip exhaust area. As a result, the known slide cover may not effectively prevent the cutting chips from scattering to the surrounding area.

SUMMARY OF THE INVENTION

It is, accordingly, one object of the present invention to teach improved portable saws having a device that serves to effectively prevent cutting chips from scattering to the surrounding area.

Preferably, a portable saw is taught that includes a chip cover and an associated control device. The chip cover can prevent cutting chips from scattering to the surrounding area and preferably pivots about an axis that is the same as the rotational axis of the saw blade.

If the chip cover pivots about the same axis as the saw blade, the positional relationship in the diametrical direction between the chip cover and the saw blade does not change, regardless of changes in the chip cover position. In addition, the control device taught herein may be utilized to suitably position the chip cover to cover the cutting chip exhaust area, which area may be defined as a position adjacent to the outer peripheral portion of the saw blade and adjacent to a base that is designed to contact or rest on a workpiece. As a result, the cover may effectively prevent the cutting chips from scattering to the surrounding area, regardless of changes in the vertical position of the saw unit relative to the base or changes in the saw blade cutting depth.

In one representative embodiment, the chip cover may have a cover portion that is spaced from an outer periphery of the saw blade by a predetermined distance and that may extend substantially along an arc about the pivotal axis. Preferably, the cover has a plate-like shape and has the cover portion at its distal end opposite to the pivotal axis.

The control device may include a cam mechanism that is provided between the chip cover and the base. Preferably, the cam mechanism includes a cam pin and a cam recess that are provided on the cover and the base, respectively.

Other objects, features and advantages of the present invention will be readily understood after reading the following detailed description together with the accompanying drawings and the claims.

DETAILED DESCRIPTION OF THE INVENTION

Figure 1:
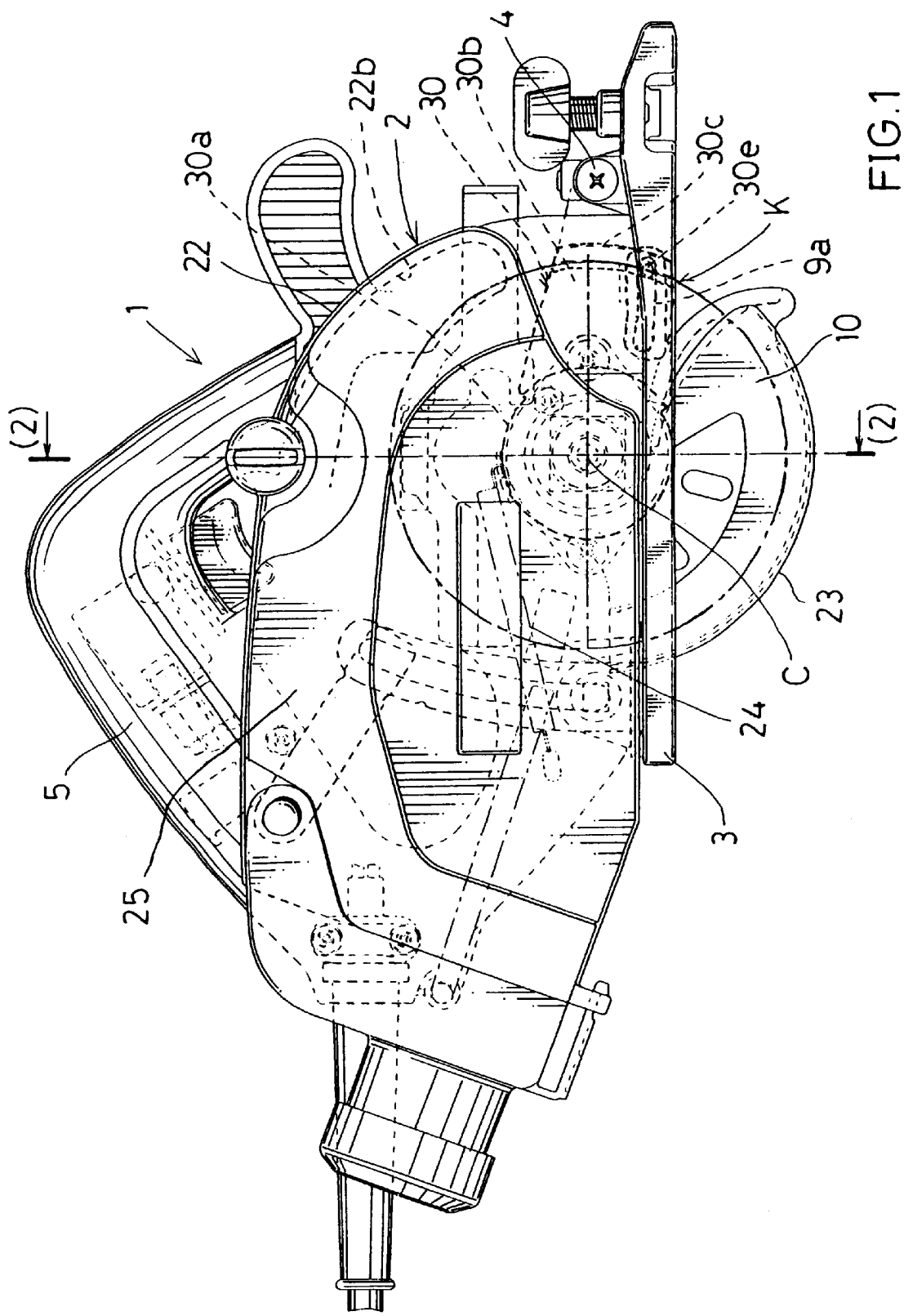
FIG. 1 is a side view of a representative embodiment of an improved portable saw.

Preferably, a portable saw includes a saw unit that has a motor and a saw blade rotatably driven by the motor. The portable saw may also include a base, which base is designed to contact or rest on a workpiece. The saw unit preferably can pivot vertically relative to the base to vary the saw blade cutting depth into the workpiece. A chip cover may be utilized to prevent cutting chips from scattering to the surrounding area and may pivot about a pivotal axis that is the same as the rotational axis of the saw blade. A control device may control the pivotal position of the chip cover in response to the vertical position of the saw unit relative to the base.

The cover may have a cover portion that is spaced from an outer peripheral portion of the saw blade by a predetermined distance and that extends substantially along an arc about the pivotal axis. Preferably, the cover has a plate-like configuration and has the cover portion at its distal end opposite to the pivotal axis. The cover portion may be integrally formed with the chip cover.

The chip cover may be formed of metal, for example by folding a flat plate into a suitable configuration, or plastic, for example by injection molding a plastic material. The chip cover also may be mounted on the saw unit on one side of the saw blade and may pivot about the saw blade. Preferably, the cover opens to the other side of the saw blade so as to facilitate saw blade mounting and removal.

Further, one end of the cover portion is preferably positioned on the side of the base, and the control device serves to maintain that end of the cover portion substantially in a predetermined position relative to the base, regardless of changes in the vertical position of the saw unit relative to the base.

In one representative embodiment, the control device may include a cam mechanism that is provided between the cover and the base. The cam mechanism may include a cam pin provided on the cover and a cam recess provided on the base. Preferably, the cam pin is integrally formed with the cover and the cam recess is formed in a cam plate that is secured to the base.

The saw unit may further include a spindle and a bearing for rotatably supporting the spindle. The motor may rotate the spindle and the saw blade may be mounted on the spindle. Preferably, the cover is rotatably mounted on an outer periphery of the bearing.

Each of the additional features and method steps disclosed above and below may be utilized separately or in conjunction with other features and method steps to provide to provide improved portable saws and methods for designing and using such portable saws. A representative example of the present invention, which example utilizes many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given of one representative example with reference to the accompanying FIGS. 1 to 7.

Figure 2:
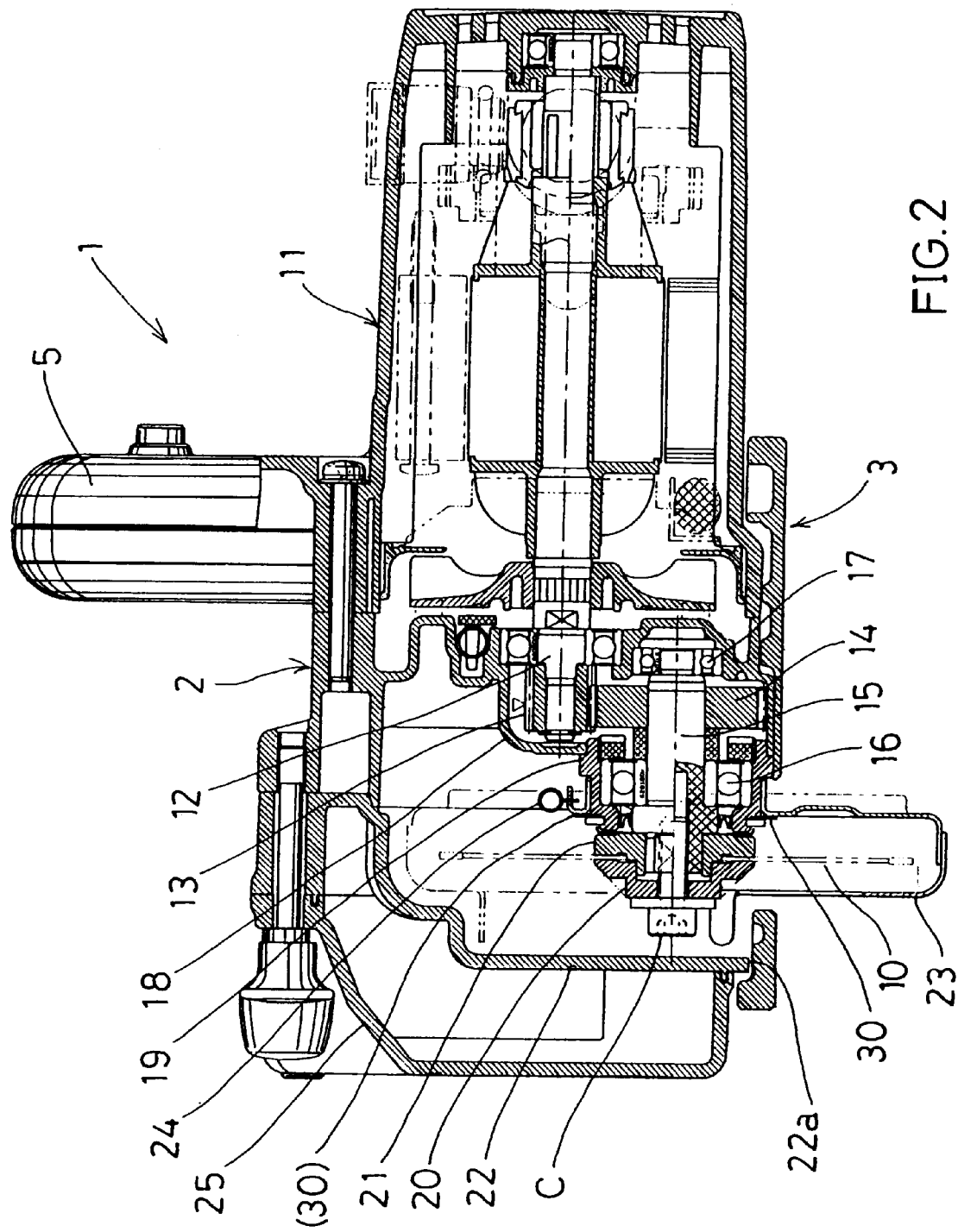
FIG. 2 is a sectional view taken along line 2—2 in FIG. 1.

A portable saw 1 is generally shown in FIGS. 1 and 2 and may have a saw unit 2 and a substantially flat plate-like base 3 that is capable of resting on a workpiece (not shown) during a cutting operation. The saw unit 2 may comprise a circular saw blade 10, an electrically driven motor 11 for rotating the saw blade 10 and a handle 5. The saw unit 2 may be coupled to the base 3 by means of a pivot pin 4 such that the saw unit 2 can pivot vertically relative to the base 3 about the pivot pin 4. The saw blade 10 preferably extends downward from the base 3 through a slot (not shown) formed in the base 3, the length of saw blade 10 that can extend through the base 3 preferably can be varied by vertically pivoting the saw unit 2 relative to the base 3. By such operation, the saw blade 10 cutting depth into the workpiece can be varied.

As will be seen from FIG. 2, the rotation of the motor 11 may be transmitted to a spindle 15 via an intermediate gear 14. The intermediate gear 14 may be secured to the spindle 15 and may engage a pinion 13 that is secured to an output shaft 12 of the motor 11. The spindle 15 may be rotatably supported by a gear case 18 and a bearing case 19 on the front side of the motor 11 by means of bearings 16 and 17, respectively. The saw blade 10 may be mounted on the front end of the spindle 15 that extends partly outwardly from the bearing case 19. The saw blade 10 may be removably mounted on the spindle 15 by means of a clamp device including an outer flange 20 and an inner flange 21, so that the saw blade 10 can rotate with the spindle 15 about a rotational axis C that is the same axis as the spindle 15.

Figure 7:
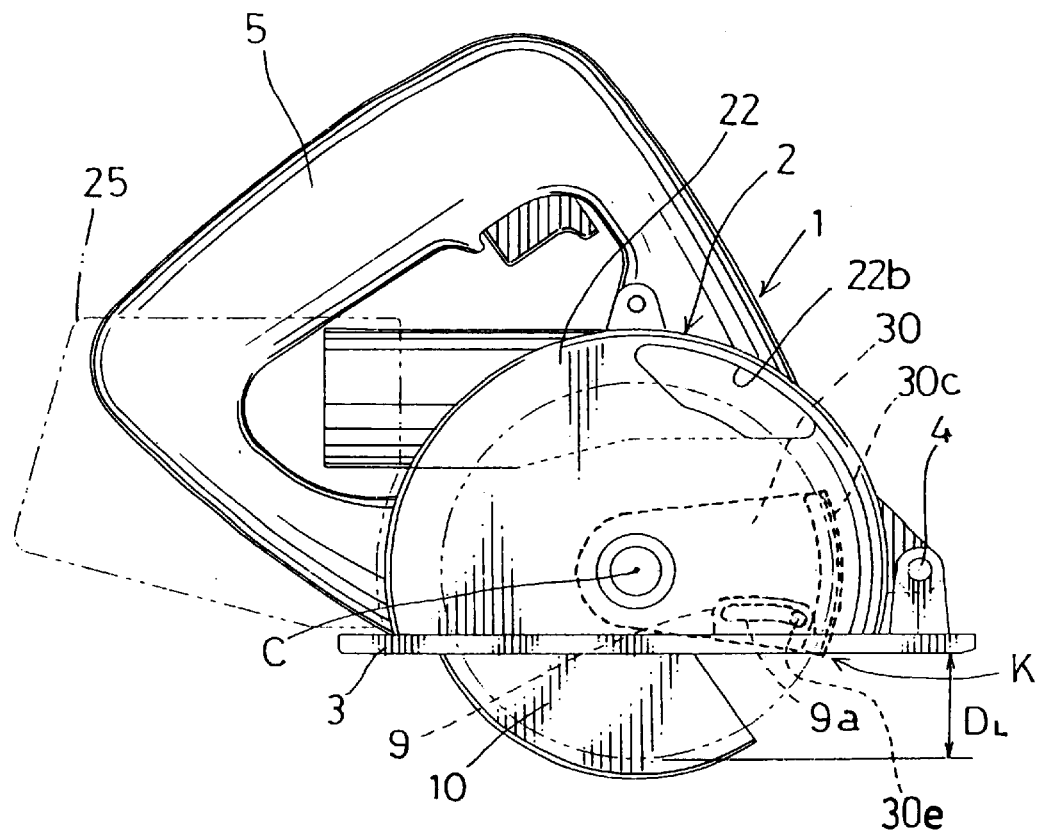
FIG. 7 is a side view of the representative embodiment in which the cutting depth is set to be maximum.
Figure 8:
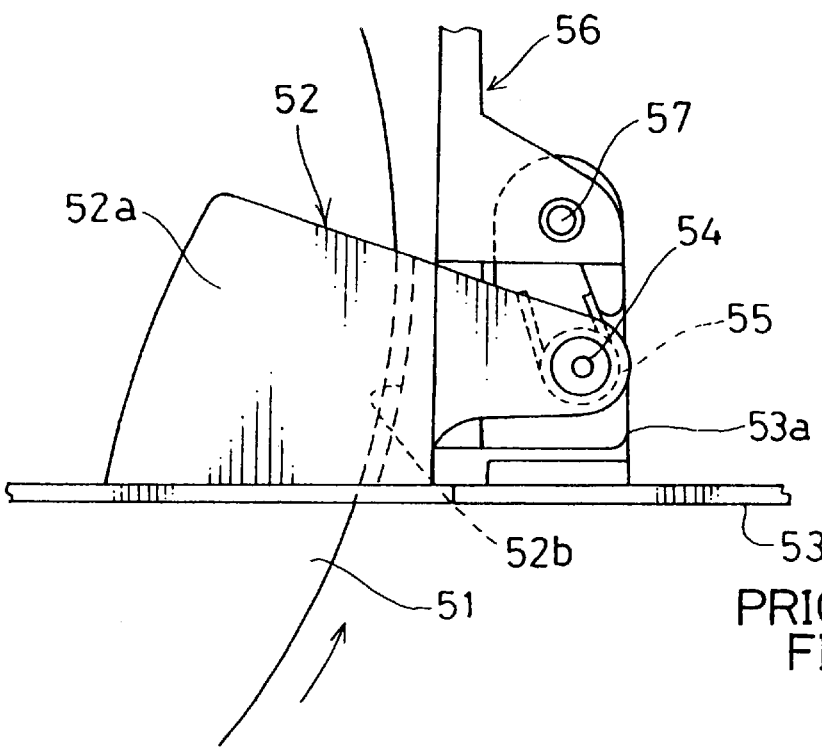
FIG. 8 is a side view of a known device for preventing cutting chips from scattering.

A blade case 22 may cover substantially the upper half of the saw blade 10 and may be fixed to the front side of the gear case 18. The blade case 22 may have a lower end 22a for contacting an upper surface of the base 3. When the lower end 22a contacts the upper surface of the base 3, the saw blade cutting depth cutting depth $D_L$ is maximized, as shown in FIG. 7.

A dust collector 25 may be mounted on one lateral side of the blade case 22 and may communicate with the interior of the blade case 22 via an opening 22b formed in the lateral wall of the blade case 22. A suction device (not shown) may be connected to the dust collector 25, so that cutting chips entering the blade case 22 can be drawn into the dust collector 25.

A blade cover 23 may be rotatably mounted on the bearing case 19 about the same axis as the rotational axis C of the saw blade 10 so as to open and close the exposed lower half of the saw blade 10. A tension coil spring 24 may be provided for normally biasing the blade cover 23 in a closing direction or a direction to cover the saw blade 10.

A device for preventing cutting chips from scattering to the surrounding area may be provided and may comprise a chip cover 30 that also is pivotally mounted on the bearing case 19, so that the chip cover 30 can pivot about the same axis as the rotational axis C of the saw blade 10.

Figure 3:
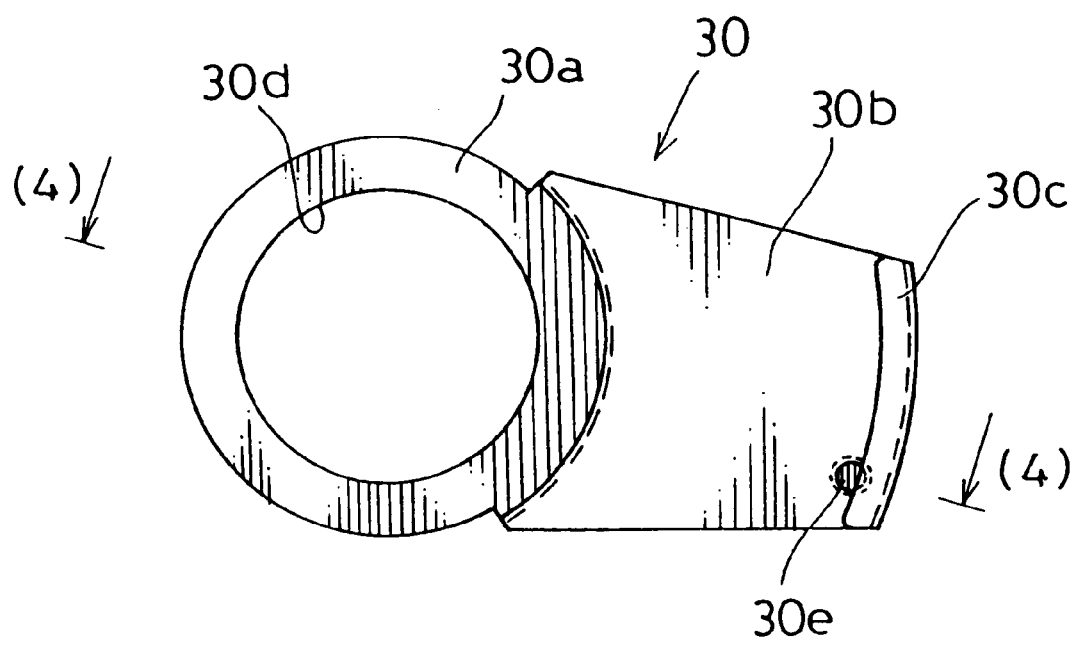
FIG. 3 is a side view of a cover of the representative embodiment.
Figure 4:
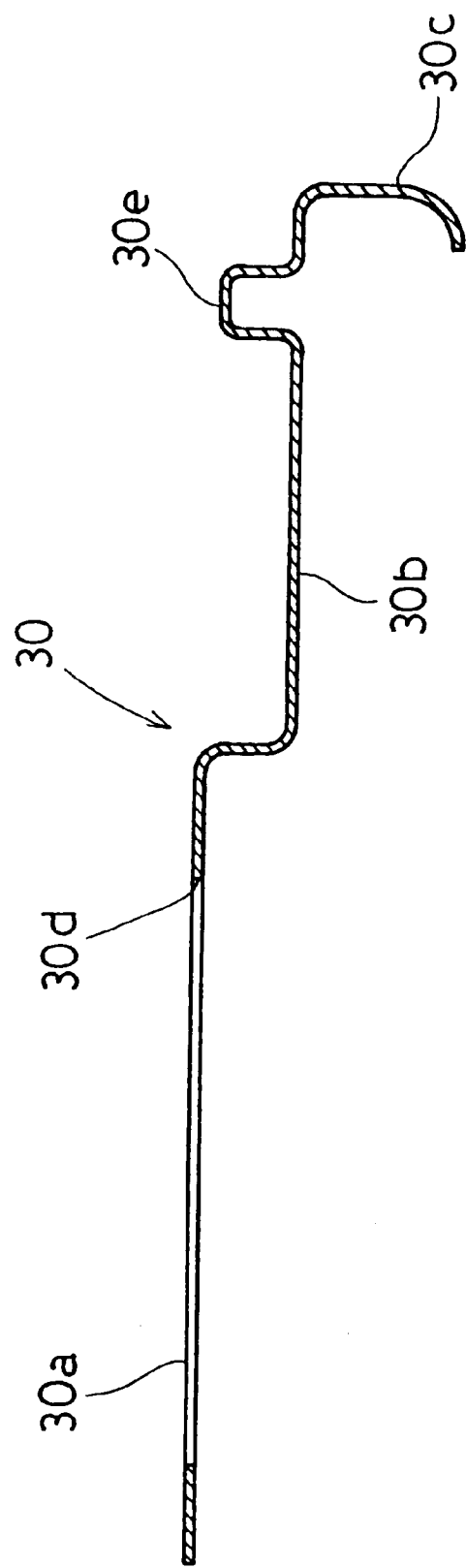
FIG. 4 is an enlarged sectional view taken along line 4—4 in FIG. 3.

As shown in FIGS. 3 and 4, the cover 30 may include an annular portion 30a, an arm portion 30b and a cover portion 30c. The annular portion 30a may be rotatably fitted on the bearing case 19 and may have a circular-mounting hole 30d for receiving the bearing case 19. The arm portion 30b may have one end connected to the annular portion 30a and may have the other end connected to the cover portion 30c. The cover 30 may be formed of metal, for example by cutting and folding a flat metal plate, or may be formed of plastic, for example by an injection molding a plastic material.

As shown in FIG. 3, the cover portion 30c may have an arc-shaped configuration to extend in the circumferential direction about the pivotal axis of the cover 30 or the rotational axis C of the saw blade 10. In addition, as shown in FIG. 4, the cover portion 30c has a substantially U-shaped cross-section so as to cover the outer peripheral portion of the saw blade 10 while being spaced therefrom by a predetermined gap. The predetermined gap may be a distance that is suitable to prevent the cover portion 30c from contacting the saw blade 10 during a cutting operation.

A control device may be provided for controlling the pivotal position of the cover 30 in response to the vertical pivotal position of the saw unit 2 relative to the base 3. The control device may comprise a cam mechanism that includes a cam protrusion 30e and a cam lot 9a for engaging the cam protrusion 30c. The cam protrusion 30e may be integrally formed with the arm portion 30b of the cover 30 in a position adjacent to the cover portion 30c and may have a substantially cylindrical configuration. The cam slot 9a may be formed in an upright guide plate 9 that is secured to the upper surface of the base 3. Preferably, the cam slot 9a has an arc-shaped configuration. Therefore, as the saw unit 2 vertically pivots about the pin 4, the cam protrusion 30e moves along the cam slot 9a. Thus, the cover 30 pivots about the pivotal axis or the rotational axis C of the saw blade 10 in response to a change in the vertical position of the pivotal axis.

Preferably, the cam slot 9a is configured such that one end in the circumferential direction of the cover portion 30a adjacent to the base 3 is substantially held in position relative to the base 3. More specifically, in this controlled position, the cover portion 30a enters the slot formed in the base 3, so that one end of the cover portion 30a may be positioned at substantially the same level as the lower surface of the base 3 or adjacent to the cutting chip exhaust area K, where chips from the workpiece that have been cut by the saw blade 10 may be exhausted in a substantially upward direction. In this representative embodiment, the saw blade 10 rotates in the counterclockwise direction as viewed in FIG. 1.

Figure 5:
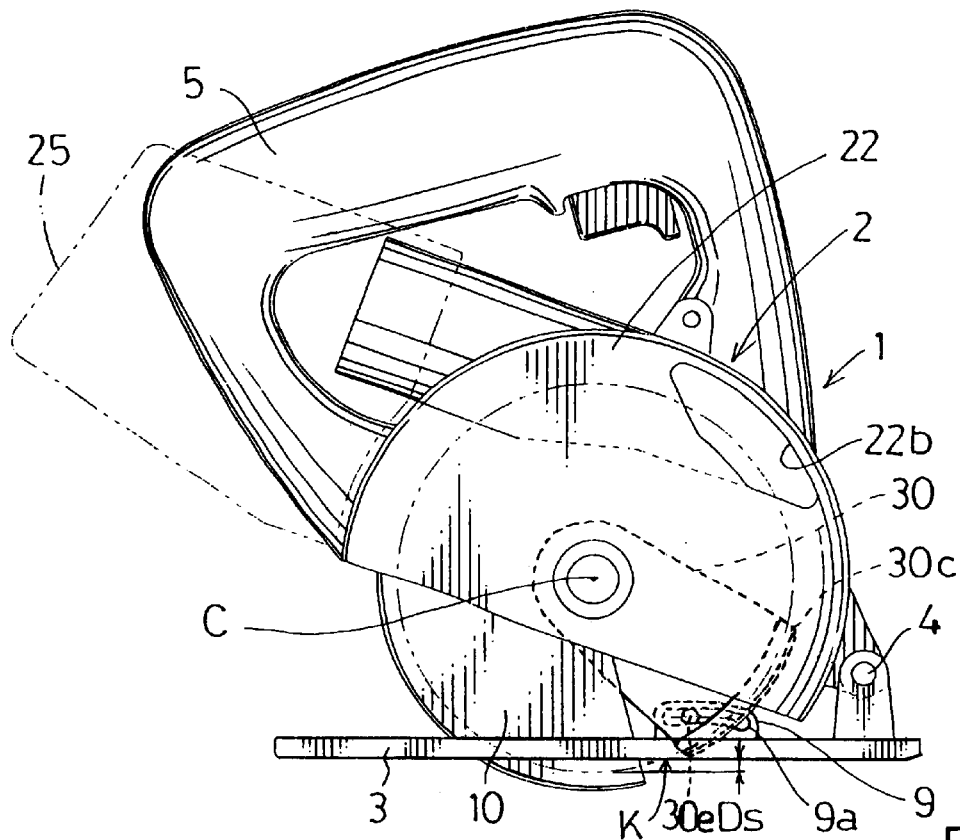
FIG. 5 is a side view of the representative embodiment in which the cutting depth is set to be minimum.
Figure 6:
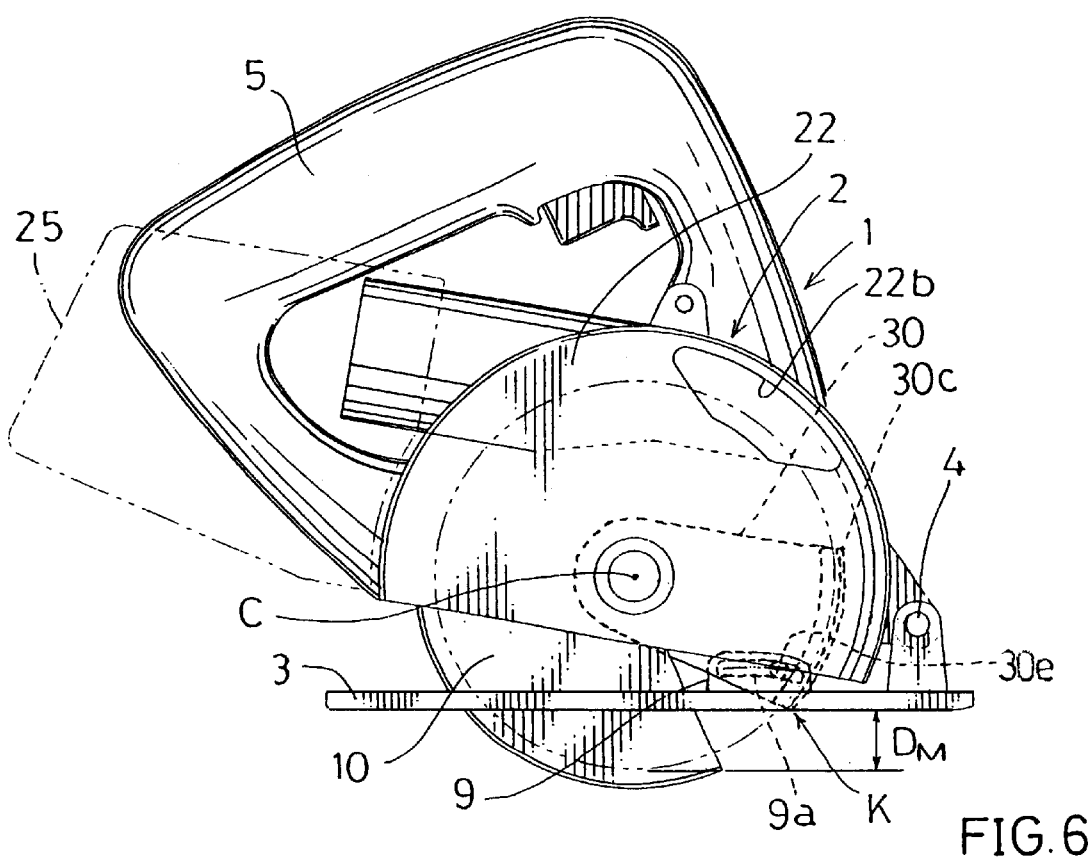
FIG. 6 is a side view of the representative embodiment in which the cutting depth is set to be medium.

FIG. 5 shows a saw unit 2 that has been pivoted to the uppermost position, thereby producing a minimum cutting depth $D_S$. FIG. 6 shows a saw unit 2 that has been pivoted to a middle position, thereby producing an intermediate cutting depth $D_M$. As described previously, FIG. 7 shows a saw unit 2 in the uppermost position, in which a maximum cutting depth $D_L$ is produced. As will be seen from these drawings, the position of one circumferential end of the cover portion 30a does not change with respect to the base 3 in each of these pivoted positions. In addition, because the cover 30 pivots about the same axis as the rotational axis C of the saw blade 10, the gap between the outer peripheral portion of the saw blade 10 and the cover portion 30c does not change, regardless of changes in the pivotal position of the cover 30. In other words, the cover portion 30c does not change in position relative to the saw blade 10 in the diametrical direction of the saw blade 10.

Therefore, the cover 30 can effectively prevent the cutting chips from scattering to the surrounding area. Consequently, the cutting chips exhausted from the exhausted area K may be forced by the air flow along the U-shaped inner wall of the cover portion 30a of the cover 30 to enter the interior of the blade case 22. With the aid of a suction device, the cutting chips entering the blade case 22 may be drawn to the dust collector 25.

Further, in the above representative embodiment, the cover 30 is mounted on the bearing case 30c that is positioned on the rear side of the saw blade 10 or on the side of the motor 11 relative to the saw blade 1. In addition, the cover 30 does not have a side wall that covers the saw blade 11 on the side opposite to the arm portion 30b. Therefore, mounting and removing the saw blade 11 or operating the clamp device does not interfere with the cover 30. Therefore, the present portable saw is improved over known portable saws. In addition, the cover 30 may have a simple construction. Further, problems are not caused by omitting a side wall that covers the saw blade 11 on the side opposite to the arm portion 30b, because the cutting chips are primarily exhausted upwardly and tangentially along the outer periphery of the saw blade 11.

As a person of skill in the art will readily understand, the above representative embodiment may be modified in various ways without departing from the invention. For example, although in the above representative embodiment, the cam protrusion 30e and the cam slot 9a of the cam mechanism are formed on cover 30 and the guide plate 9, respectively, the cam protrusion 30e and the cam slot 9a of the cam mechanism may be formed on the guide plate 9 and the cover 30, respectively. In addition, the cover portion 30a may have a straight configuration extending in a tangential direction relative to the saw blade 11.

What is claimed is:

1. A portable saw comprising:
   a saw unit having a motor and a saw blade rotatably driven by said motor;
   a base, wherein the saw unit is adapted to pivot vertically relative to the base to vary a cutting depth of said saw blade into a workpiece;
   a chip cover adapted to prevent cutting chips from scattering to the surrounding area, wherein the chip cover is further adapted to pivot about the pivotal axis of said saw blade in order to maintain substantially the same relationship with the saw blade when the saw blade is vertically pivoted relative to the base; and
   a control device for controlling the pivotal position of said chip cover in response to the vertical position of said saw unit relative to said base, wherein the chip cover does not pivot during a cutting operation.

2. A portable saw as defined in claim 1 wherein said cover has a cover portion that is spaced from an outer peripheral portion of said saw blade by a predetermined distance and that extends substantially along an arc about said pivotal axis.

3. A portable saw as defined in claim 2 wherein said cover portion has one end opposite to said base in the circumferential direction, and wherein said control device is operable to maintain said one end of said cover portion substantially in a predetermined position relative to said base, regardless of changes in vertical position of said saw unit relative to said base.

4. A portable saw as defined in claim 1 wherein said cover has a plate-like configuration and the cover portion is disposed at a distal end of the cover opposite to the pivotal axis.

5. A portable saw as defined in claim 4 wherein said cover portion is integrally formed with said cover.

6. A portable saw as defined in claim 4 wherein said cover is a metal plate.

7. A portable saw as defined in claim 1 wherein said control device comprises a cam mechanism that is disposed between said cover and said base.

8. A portable saw comprising:
   a saw unit having a motor and a saw blade rotatably driven by said motor;
   a base, wherein the saw unit can be pivoted vertically relative to said base to vary a cutting depth of said saw blade into a workpiece;
   a chip cover adapted to prevent cutting chips from scattering to the surrounding area that can pivot about a pivotal axis that is substantially the same as the rotational axis of said saw blade; and
   a control device for controlling the pivotal position of said chip cover in response to the vertical position of said saw unit relative to said base, wherein said control device comprises a cam mechanism that is disposed between said cover and said base, and
   wherein said cam mechanism includes a cam pin disposed on the cover and a cam recess disposed on the base.

9. A portable saw as defined in claim 8 wherein said cam pin is integrally formed with said cover and wherein said cam recess is formed in a cam plate that is secured to said base.

10. A portable saw as defined in claim 1 wherein said saw unit further includes a spindle and a bearing for rotatably supporting said spindle, said spindle being adapted to be rotatably driven by said motor and having said saw blade mounted thereon, and said cover being rotatably mounted on an outer periphery of said bearing.

11. A portable saw comprising:
   a saw unit having a motor and a saw blade rotatably driven by said motor;

a base, wherein the saw unit can be pivoted vertically relative to said base to vary a cutting depth of said saw blade into a workpiece;

a chip cover adapted to prevent cutting chips from scattering to the surrounding area that can pivot about a pivotal axis that is substantially the same as the rotational axis of said saw blade; and a control device for controlling the pivotal position of said chip cover in response to the vertical position of said saw unit relative to said bases wherein said cover has a cover portion that is spaced from an outer peripheral portion of said saw blade by a predetermined distance and that extends substantially along an arc about said pivotal axis, said cover portion has one end opposite to said base in the circumferential direction, and wherein said control device is operable to maintain said one end of said cover portion substantially in a fixed position relative to said base, regardless of changes in vertical position of said saw unit relative to said base, said control device comprises a cam mechanism that is disposed between said cover and said base, said cam mechanism includes a cam pin disposed on said cover and a cam recess disposed on said base, said cam pin is integrally formed with said cover and said cam recess is formed in a cam plate that is secured to said base and said saw unit further includes a spindle and a bearing for rotatably supporting said spindle, said spindle being adapted to be rotatable driven by said motor and having said saw blade mounted thereon, and said cover being rotatable mounted on an outer periphery of said bearing.

12. A saw comprising:

a motor, a saw blade driven by the motor, the saw blade having a rotational axis, a blade guard that pivots about a pivotal axis that is substantially the same as the rotational axis of the saw blade during a cutting operation, a base, means for coupling the saw blade to the base, wherein the saw blade is arranged and constructed to pivot vertically relative to the base to vary the saw blade cutting depth, a chip cover that pivots about a pivotal axis that is substantially the same as the rotational axis of the saw blade, and means for controlling the pivotal position of the chip cover in response to vertical movement of the saw blade relative to said base.

13. A saw comprising:

a motor;

a saw blade driven by said motor;

a base;

means for coupling said saw unit to said base, whereby said saw blade can pivot vertically relative to said base to vary the saw blade cutting death;

a chip cover coupled to said saw blade and that pivots about a pivotal axis that is substantially the same as the rotational axis of said saw blade, and means for controlling the pivotal position of said chip cover in response to vertical movement of said saw blade relative to said base;

wherein said control means maintains said chip cover in a fixed position relative to said base as said saw blade pivots vertically with respect to said base.

14. A saw as defined in claim 13 wherein said control means comprises a cam mechanism that is disposed between said chip cover and said base, said cam mechanism includes a cam pin disposed on said chip cover and a cam recess disposed on said base and said cam pin is integrally formed with said chip cover and said cam recess is formed in a cam plate that is secured to said base.

15. A saw comprising:

a motor, a saw blade driven by the motor, a base, a pivotal coupling connecting the saw blade and motor to the base, wherein the saw blade is adapted to pivot vertically relative to the base, a chip cover disposed around the saw blade, and covering a portion of the saw blade that is less than a 45 degree sector of the saw blade and means for fixing the chip cover in a position relative to the base during vertical movement of the saw blade relative to the base, the fixing means pivoting about a pivotal axis that is substantially the same as the rotational axis of the saw blade.

16. A saw as defined in claim 15 wherein said fixing means comprises a cam mechanism that is disposed between said chip cover and said base, said cam mechanism includes a cam pin integrally formed with said chip cover and a cam recess is formed in a cam plate that is secured to said base.

17. A portable saw as defined in claim 1 wherein said control device serves to automatically control the pivotal position of said chip cover in response to change in the vertical position of said saw unit relative to the base.

18. A portable saw as defined in claim 1 wherein said chip cover is disposed adjacent said base so as to cover a part of the peripheral portion of said saw base.

* * * * *